(12) United States Patent
Tsuzuki et al.

(10) Patent No.: US 8,780,389 B2
(45) Date of Patent: Jul. 15, 2014

(54) IMAGE PROCESSING DEVICE FOR MODIFYING OPERATING MODE

(75) Inventors: Toru Tsuzuki, Okazaki (JP); Masahiro Nagami, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 38 days.

(21) Appl. No.: 13/071,745

(22) Filed: Mar. 25, 2011

(65) Prior Publication Data

US 2011/0249291 A1 Oct. 13, 2011

(30) Foreign Application Priority Data

Apr. 12, 2010 (JP) ................................ 2010-091399

(51) Int. Cl.
*G06F 3/12* (2006.01)

(52) U.S. Cl.
USPC .......... 358/1.15; 358/1.13; 358/1.18; 399/70; 399/75; 399/88

(58) Field of Classification Search
USPC ................. 358/1.1, 1.8, 1.9, 1.13, 1.15, 1.18; 347/37; 363/56.01
See application file for complete search history.

(56) References Cited

U.S. PATENT DOCUMENTS

| | | | | |
|---|---|---|---|---|
| 6,807,907 | B2 * | 10/2004 | Yamada | 101/484 |
| 2002/0134268 | A1 * | 9/2002 | Yamada | 101/484 |
| 2004/0004732 | A1 * | 1/2004 | Takeda et al. | 358/1.13 |
| 2007/0146775 | A1 * | 6/2007 | Maeda | 358/1.15 |
| 2008/0112722 | A1 * | 5/2008 | Hasegawa | 399/70 |
| 2008/0244227 | A1 * | 10/2008 | Gee et al. | 712/30 |
| 2009/0268225 | A1 * | 10/2009 | Sugiyama | 358/1.14 |
| 2011/0051166 | A1 * | 3/2011 | Nishikawa | 358/1.13 |

FOREIGN PATENT DOCUMENTS

| | | |
|---|---|---|
| JP | H08-101609 A | 4/1996 |
| JP | 2000-357075 A | 12/2000 |
| JP | 2001-100968 | 4/2004 |
| JP | 2004-280378 A | 10/2004 |
| JP | 2007-105917 | 4/2007 |
| JP | 2009-265434 A | 11/2009 |

OTHER PUBLICATIONS

Office Action issued in Japanese Patent Application No. 2010-091399 mailed Apr. 1, 2014.

* cited by examiner

*Primary Examiner* — Houshang Safaipour
*Assistant Examiner* — Idowu O Osifade
(74) *Attorney, Agent, or Firm* — Banner & Witcoff, Ltd.

(57) ABSTRACT

An image processing device includes a detecting unit, a processing unit, a plurality of controllers, a command determination unit, and a load determination unit. The detecting unit is for detecting a command. The processing unit executes a process for the command. The plurality of controllers controls the processing unit and includes a first controller. The command determination unit determines whether or not the command indicates that the process is to be executed by the processing unit under the control of the first controller. The load determination unit determines whether or not a load required for the process is larger than a prescribed threshold value. While the first controller is in a halted state, if the command determination unit makes a negative determination and if the load determination unit makes a positive determination, the first controller is activated and controls the processing unit to execute the process.

10 Claims, 8 Drawing Sheets

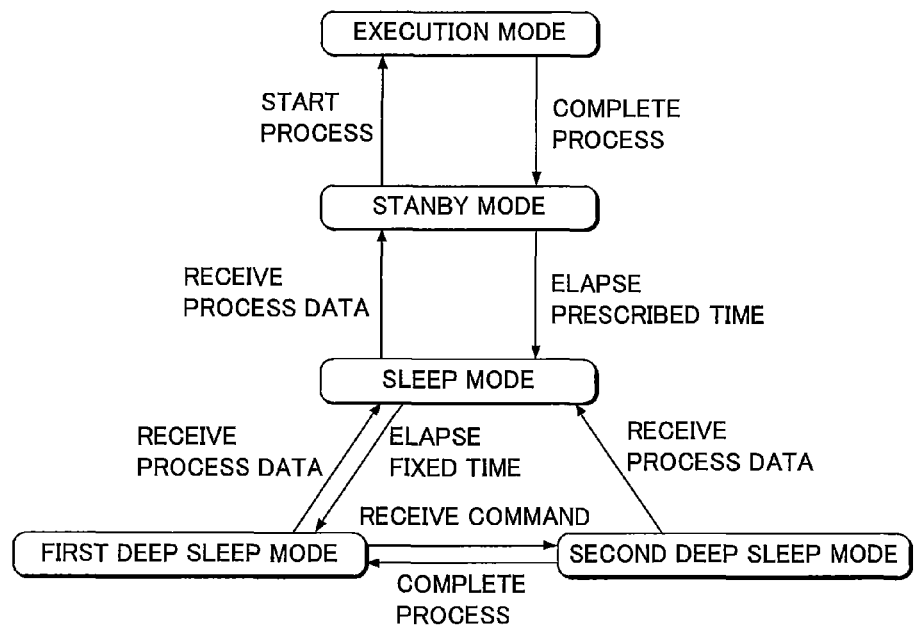

FIG. 4

| OPERATION MODE | DRIVEN DEVICES |
|---|---|
| EXECUTION MODE | ALL DEVICES |
| STANBY MODE | ALL DEVICES |
| SLEEP MODE | ALL DEVICES EXCEPT FOR FIXING DEVICE |
| FIRST DEEP SLEEP MODE | SUB CPU, SUB INTERRUPT CONTROLLER, SRAM USB I/F, NETWORK I/F, FAX I/F, DISPLAY PANEL, INPUT KEY, LOW-VOLTAGE POWER SUPPLY, AND SOME SENSOR DEVICES |
| SECOND DEEP SLEEP MODE | MAIN CPU, MAIN INTERRUPT CONTROLLER, SUB CPU, SUB INTERRUPT CONTROLLER, SRAM, USB I/F, NETWORK I/F, FAX I/F, DISPLAY PANEL, INPUT KEY, LOW-VOLTAGE POWER SUPPLY, AND SOME SENSOR DEVICES |

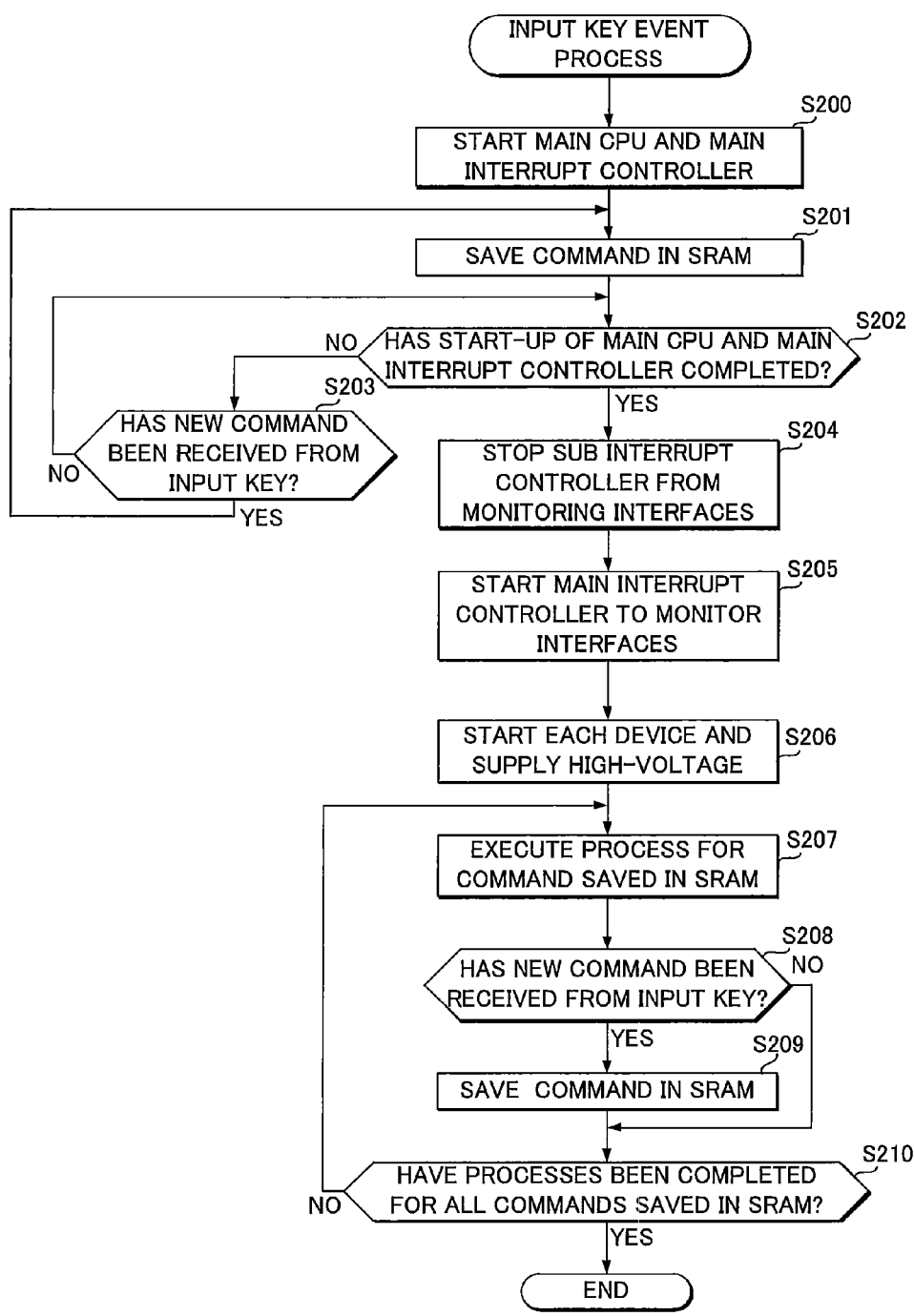

IMAGE PROCESSING DEVICE FOR MODIFYING OPERATING MODE

CROSS REFERENCE TO RELATED APPLICATION

This application claims priority from Japanese Patent Application No. 2010-091399 filed Apr. 12, 2010. The entire content of this priority application is incorporated herein by reference.

TECHNICAL FIELD

The present invention relates to an image processing device and a computer readable storage medium storing programs for controlling the image processing device.

BACKGROUND

Image processing devices capable of executing jobs using functions for processing image data, such as scan, copy, PC-print, and fax transmission/reception functions, are well known in the art. Many of these image processing devices are configured to reduce power consumption by modifying their operating mode.

For example, one conventional print system includes a host computer and a printer. When the printer is in a power-saving standby mode for reducing power consumption, the host computer sends release data to the printer at prescribed times to wake the printer from the power-saving standby mode. Prescribed times are triggered by certain events, such as the start of the operating system on the host computer, the start of an application program, the display of a print preview window, and the like.

The conventional print system is configured in this way in order to wake the printer more quickly from the power-saving standby mode and shorten the printing wait time.

SUMMARY

Although there are many methods of modifying the operating mode of an image processing device, such as that described above for the conventional print system, there is still need for a method to modify the operating mode more efficiently.

In view of the foregoing, it is an object of the present invention to provide an image processing device capable of modifying the operating mode of a controller more efficiently and a computer readable storage medium storing programs for controlling the image processing device.

In order to attain the above and other objects, the invention provides an image processing device. The image processing device includes a detecting unit, a processing unit, a plurality of controllers, a command determination unit, and a load determination unit. The detecting unit is for detecting a command. The processing unit executes a process for the command. The plurality of controllers controls the processing unit and includes a first controller. The command determination unit determines whether or not the command indicates that the process is to be executed by the processing unit under the control of the first controller. The load determination unit determines whether or not a load required for the process is larger than a prescribed threshold value. While the first controller is in a halted state, if the command determination unit makes a negative determination and if the load determination unit makes a positive determination, the first controller is activated and controls the processing unit to execute the process.

According to another aspect, the present invention provides a non-transitory computer readable storage medium storing a set of program instructions installed on and executed by an image processing device, the image processing device comprising a detecting unit for detecting a command, a processing unit that executes a process for the command, a plurality of controllers that controls the processing unit and includes a specific controller, the program including: making a first determination, while the specific controller is in a halted state, whether or not the command indicates that the process is to be executed by the processing unit under the control of the specific controller; making a second determination, while the specific controller is in a halted state, whether or not a load required for the process is larger than a prescribed threshold value; and activating the specific controller if the first determination is a negative determination and if the second determination is a positive determination so as to execute the process with the processing unit.

BRIEF DESCRIPTION OF THE DRAWINGS

The particular features and advantages of the invention as well as other objects will become apparent from the following description taken in connection with the accompanying drawings, in which:

FIG. 2 is an explanatory diagram illustrating a transition of the various operating modes of the printer 1;

FIG. 3 is a table showing a supply state of power in each of the operating modes;

FIG. 4 is a table showing a driven devices in each of the operating modes;

FIG. 9 is a flowchart illustrating an input key event process.

DETAILED DESCRIPTION

Figure 1:
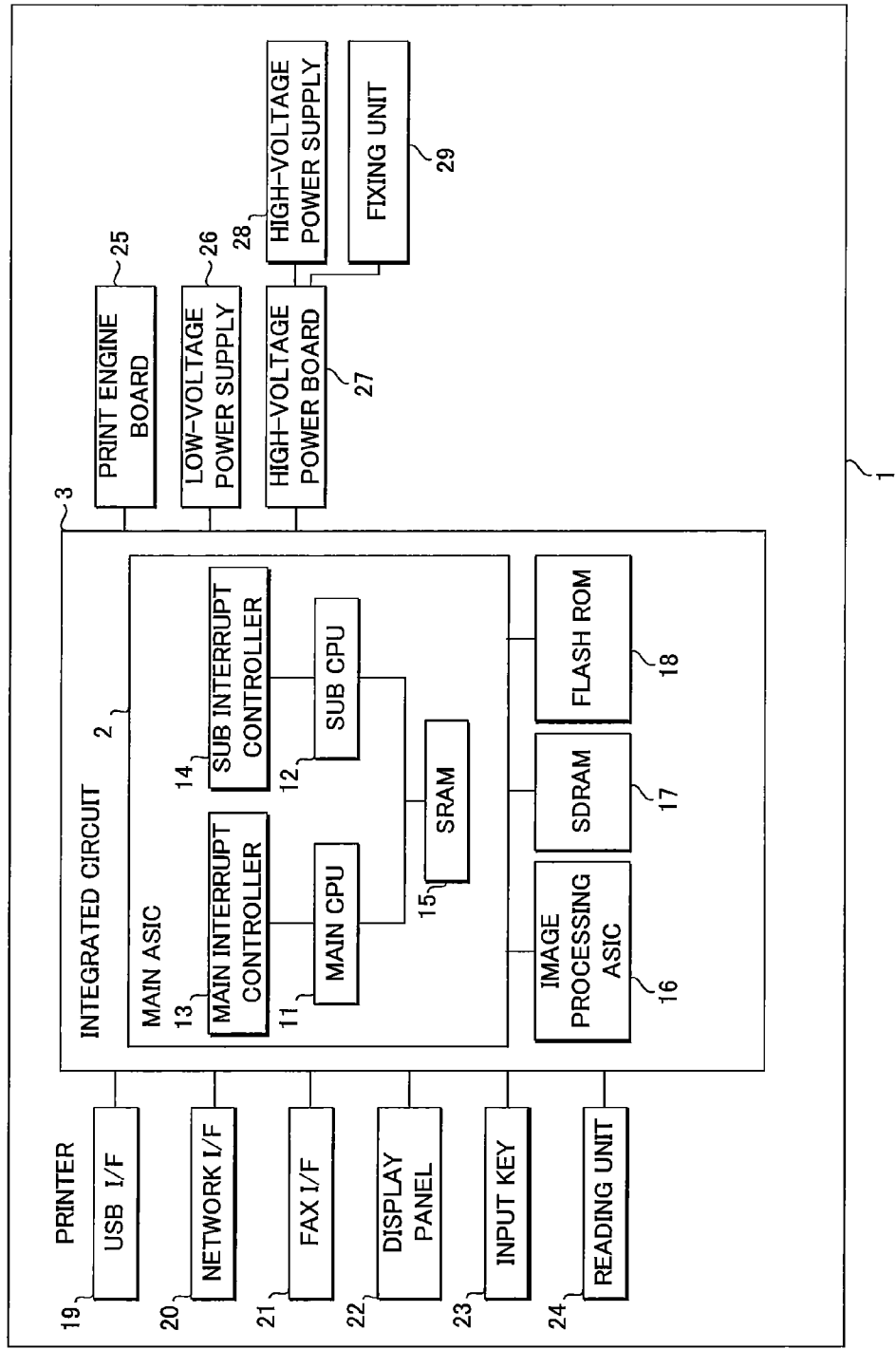
FIG. 1 is a block diagram illustrating an electrical structure of a printer according to an embodiment of the present invention.

A printer 1 shown in FIG. 1 is a multifunction device capable of implementing a plurality of functions, including a print function, a copy function, a scan function, and a fax function.

As shown in FIG. 1, the printer 1 is provided with two CPUs; namely, a main CPU 11 and a sub CPU 12. The CPUs 11 and 12 are respectively connected to a main interrupt controller 13 and a sub interrupt controller 14 that detect interrupt signals (requests) for the respective CPUs 11 and 12. These interrupt controllers 13 and 14 monitor various interfaces (described later) for the interrupt signals.

Upon detecting an interrupt signal, the interrupt controllers 13 and 14 pass an interrupt cause to the corresponding CPUs 11 and 12. The CPUs 11 and 12 are connected to a static random access memory (SRAM) 15 and use storage areas in the SRAM 15 when executing processes based on programs described later.

The CPUs 11 and 12, the interrupt controllers 13 and 14, and the SRAM 15 constitute a main application-specific integrated circuit (ASIC) 2. The main ASIC 2 serves as the core of control for various processes.

The main CPU 11 has a higher processing capacity and consumes more power than the sub CPU 12. For example, the main CPU 11 has a maximum clock of 1 GHz and a power consumption of 50 W, while the sub CPU 12 has a maximum clock of 300 MHz and a power consumption of 20 W. Hence, the main CPU 11 is driven at a higher operating clock than the sub CPU 12 and can execute processes using devices having a higher processing load, as will be described later. On the other hand, the sub CPU 12 can operate using less power than the main CPU 11, enabling the printer 1 to operate with less power consumption.

Also connected to the main ASIC 2 are an image-processing ASIC 16, a synchronous dynamic random access memory (SDRAM) 17, and a flash read-only memory (flash ROM) 18. The image-processing ASIC 16 can perform image processing for converting image data inputted from a reading unit 24, a network interface 20, or the like described later to a data format that can be printed, saved, or the like.

The SDRAM 17 has substantially the same functions as the SRAM 15. That is, the CPUs 11 and 12 use storage areas in the SDRAM 17 when executing processes based on programs described later. The primary differences between the SRAM 15 and SDRAM 17 are that the SRAM 15 uses less power than the SDRAM 17 and can be incorporated in the main ASIC 2. However, the SDRAM 17 can generally be constructed at a lower cost.

The flash ROM 18 stores programs for executing the various processes described later and other processes. When executing these processes, a program stored in the flash ROM 18 is loaded into the SRAM 15 or the SDRAM 17 as appropriate, and the main CPU 11 or the sub CPU 12 executes the program.

The data buses of the SDRAM 17 and the flash ROM 18 connected to the main ASIC 2 have different response rates. Specifically, memory like the SDRAM 17 that requires frequent accesses by the CPUs 11 and 12 to execute processes is connected with a high-speed bus capable of quick response, while memory such as the flash ROM 18 storing programs that are transferred to the SRAM 15 or the SDRAM 17 is connected by a low-speed bus with a low response rate.

The main ASIC 2, the image-processing ASIC 16, the SDRAM 17, and the flash ROM 18 described above configure an integrated circuit 3. In other words, the above components are integrated to form a circuit on a chip.

Connected to the integrated circuit 3 are a USB interface (USB I/F) 19, the network interface (network I/F) 20, a fax interface (fax I/F) 21, a display panel 22, input keys 23, the reading unit 24, a print engine board 25, a low-voltage power supply 26, and a high-voltage power board 27.

The USB interface 19 is a port that allows the printer 1 to be connected to an external data processor via a USB cable. The network interface 20 is a port that allows the printer 1 to be connected to an external network (an interne, an intranet, or the like). The external data processors may be connected to these interfaces, and the printer 1 may execute printing operations in response to print commands received from the external data processors via these interfaces, for example. The fax interface 21 is a port that enables the transmission and reception of faxes over a telephone line.

The display panel 22 is provided on the external surface of the printer 1 for displaying an operating mode (described later) of the printer 1 and information regarding the status of a process. The input keys 23 constitute a user interface provided on the external surface that enables the user to update various settings for the printer 1 or instruct the printer 1 to perform various processes, such as when the user wishes to use the scan function.

The reading unit 24 is a device that optically reads an original as scan data. A copy function is implemented by subjecting this scan data to image processing by the image-processing ASIC 16 and the like and to a printing process through the print engine board 25 and the like.

The print engine board 25 is a device that controls a print engine (not shown), primarily configured of photosensitive members and a laser scanner, for printing images on sheets. The printer 1 of the embodiment is capable of printing with an electrophotographic system well known in the art. Thus, the print engine board 25 controls the operations of the print engine to generate electrostatic latent images on the photosensitive members. A fixing unit 29 described later, various motors (not shown), and other devices enable the implementation of a print function by conveying a sheet and printing an image on the sheet.

The low-voltage power supply 26 is one power source that drives the printer 1. The low-voltage power supply 26 can be driven in one of two power supply modes, a normal mode and a low-voltage mode, for switching the amount of voltage that is supplied. As will be described below, the printer 1 is also provided with a high-voltage power supply 28 in addition to the low-voltage power supply 26 and can be driven by both power sources.

The high-voltage power board 27 is connected to the high-voltage power supply 28, the fixing unit 29, and the like that are driven by high voltages. The high-voltage power board 27 conducts centralized control primarily of devices driven at high voltages. The high-voltage power supply 28 is one power source that drives the printer 1, similar to the low-voltage power supply 26 described above. The high-voltage power supply 28 can supply a higher voltage than the low-voltage power supply 26 and, unlike the low-voltage power supply 26, cannot be switched among a plurality of power supply modes for changing the amount of power supplied.

The fixing unit 29 functions to fix a toner image to the sheet after the toner image has been transferred to the sheet by the print engine board 25 described above. The fixing unit 29 has an internal heater that requires a large power supply. Hence, the fixing unit 29 cannot be driven by the low-voltage power supply 26 and must be driven by the high-voltage power supply 28.

In addition to the high-voltage power supply 28 and the fixing unit 29, other devices requiring a high-voltage power supply are connected to the high-voltage power board 27, and include a device for regulating the output power of the laser scanner, and a conveying motor for conveying sheets.

The components described above constitute the printer 1 and implement various processes and operating modes described below. In the embodiment, a "device" denotes one of the various components described above.

The CPUs 11 and 12 can execute various processes. Some specific processes executed by the main CPU 11 include processes for implementing print, copy, scan, and fax functions, a process to update (change) the display state of text on the display panel 22, and the like.

Examples of specific processes executed by the sub CPU 12 include a connection process for the USB interface 19 (PnP processes for the external data processors and processes conforming to the USB protocol, for example), connection and disconnection processes for the network interface 20 (processes to assign and clear IP addresses, for example), and some processes for network requests (management information base requests or the like). These processes require a relatively large process load among processes executed by the sub CPU 12.

Other specific processes executed by the sub CPU 12 include connection maintenance processes for the USB interface 19 (processes for confirming connections from the external data processors and responses to status requests within the printer 1 itself, for example), connection maintenance processes for the network interface 20 (processes for executing only responses unrelated to the status of the printer 1, for example), a warning/alerting process that only alters the display by flashing an LCD or LEDs of the display panel 22 without changing the display state of text and the like. These processes have a relatively light process load among processes executed by the sub CPU 12.

As shown in FIG. 2, the printer 1 of the embodiment has four operating modes: an execution mode, a standby mode, a sleep mode, a first deep sleep mode, and a second deep sleep mode.

The execution mode is a mode in which the printer 1 drives various devices to execute processes and corresponds to the state in which the printer 1 implements the various functions described above. In this mode, the power supply mode of the low-voltage power supply 26 is set to the normal mode, and the high-voltage power supply 28 is also driven, as shown in FIG. 3.

Figure 5:
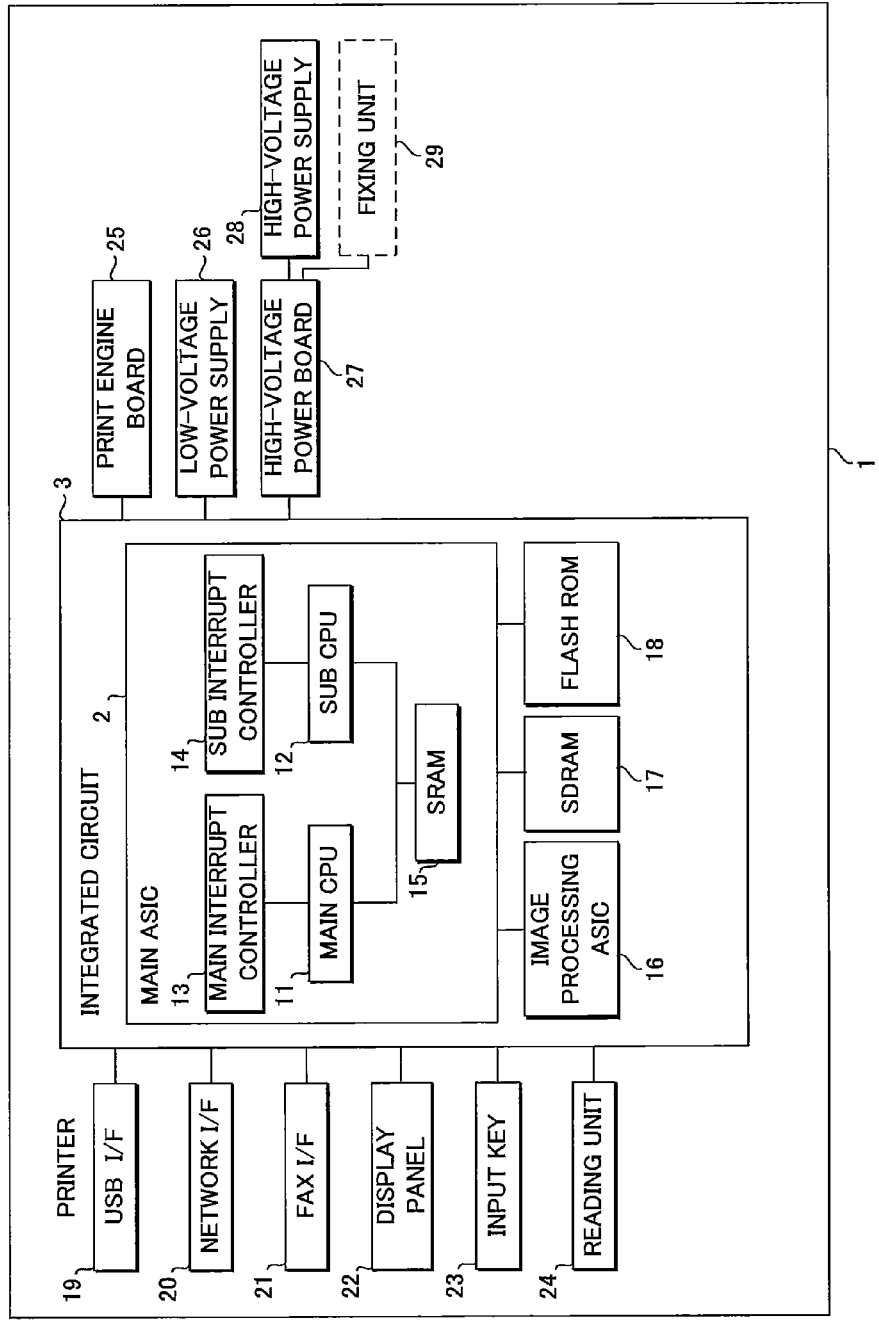
FIG. 5 is a block diagram showing the driven devices in a sleep mode.

Further, all devices are in a driven state in the execution mode, as indicated by the driven devices in FIG. 4. When represented in a block diagram, this state corresponds to the state shown in FIG. 1. In the block diagram of FIG. 1 and in the block diagrams of FIGS. 5, 6, and 7 described later, solid lines represent devices in a driven state, while dashed lines represent devices in a suspended state. In the execution mode, the maximum capacity of the printer 1 can be achieved when executing processes of the various functions by the high voltage supplied from the low-voltage power supply 26 and the high-voltage power supply 28.

The standby mode is a mode in which the printer 1 waits or prepares for transition to the execution mode. The power supply state and driven devices in the standby mode are identical to those in the execution mode described above (i.e., the state shown in the block diagram of FIG. 1). The standby mode differs from the execution mode whether or not processes are executed. Specifically, in the standby mode, the printer 1 maintains each device in the driven state or prepares each device to be drivable (by raising the temperature in the fixing unit 29 and maintaining this temperature, for example) so that the printer 1 can be quickly shifted to the execution mode.

As shown in FIG. 2, the beginning of a functional process executed by the main CPU 11, such as the start of a print job, is the condition for transitioning from the standby mode to the execution mode. Conversely, the end of the functional process, such as the end of the printing job, is the condition for transitioning back from the execution mode to the standby mode.

The sleep mode is used to operate the printer 1 with reduced power consumption. While the power supply state in the sleep mode is identical to that in the execution mode and the standby mode, the driving state of devices differs. As shown in FIG. 4, only the fixing unit 29 is halted in the sleep mode, while all devices other than the fixing unit 29 are in a driven state. This state is represented in the block diagram of FIG. 5. The sleep mode can sufficiently lower power consumption in the printer 1 by halting the fixing unit 29, which is the component that consumes the most power in the printer 1.

Further, in the sleep mode, if a command is issued by the user to execute some process, the printer 1 need only drive the fixing unit 29 to prepare for the process. Hence, the printer 1 can begin the process in the execution mode relatively quickly.

As shown in FIG. 2, the condition for shifting from the sleep mode to the standby mode is the reception of process data (a command for executing a process) for a function executed by the main CPU 11, such as the reception of print data from the external data processor or the like via the USB interface 19 or the network interface 20. Conversely, the condition for shifting from the standby mode to the sleep mode is the passing of a prescribed time (five minutes, for example) after shifting from the execution mode to the standby mode.

Further, since the main CPU 11 and the SDRAM 17 are driven during the execution mode, the standby mode, and the sleep mode, the main CPU 11 can execute various processes in the SRAM 15 and the SDRAM 17 in these modes by loading programs for the main CPU 11 from the flash ROM 18 to the SDRAM 17.

The first deep sleep mode is a mode in which the printer 1 is operated at even lower power than in the sleep mode. The power supply state in this mode differs from each of the modes described above. That is, the low-voltage power supply 26 is driven in the low voltage mode, while the high-voltage power supply 28 is not driven, as shown in FIG. 3.

Figure 6:
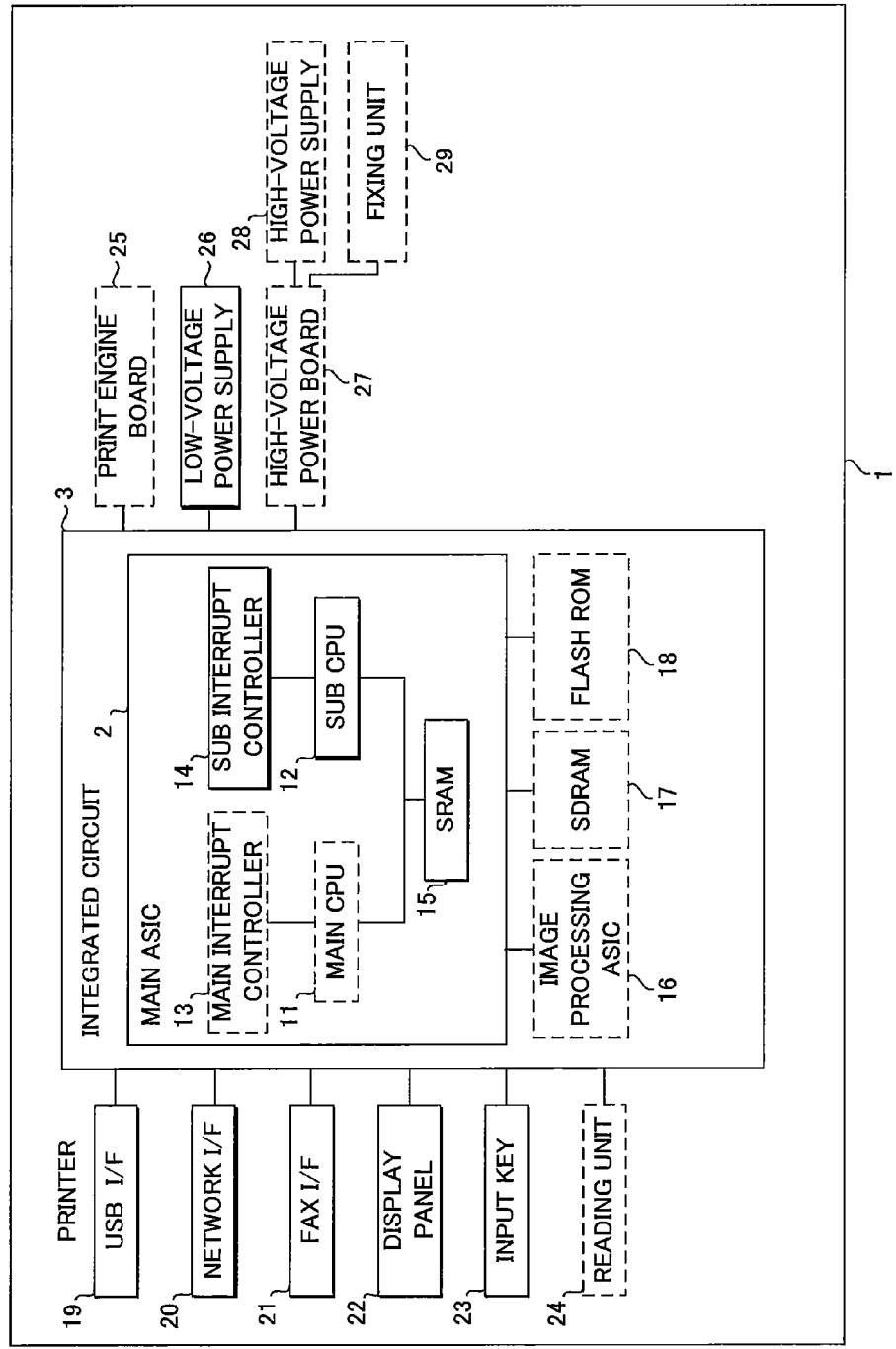
FIG. 6 is a block diagram showing the driven devices in a first deep sleep mode.

As indicated in FIG. 4, the devices that are driven in the first deep sleep mode are only the sub CPU 12, the sub interrupt controller 14, the SRAM 15, the USB interface 19, the network interface 20, the fax interface 21, the display panel 22, the input keys 23, the low-voltage power supply 26, and some sensor devices (not shown). FIG. 6 illustrates this state in a block diagram. In the first deep sleep mode, essentially only devices in the printer 1 related to the interfaces for the user are driven, while all other devices are halted. Consequently, only the minimum essential devices are in a driven state, further reducing power consumption of the printer 1 than the sleep mode.

As shown in FIG. 2, the condition for transitioning from the first deep sleep mode to the sleep mode is the reception of process data (a command for executing a process) for functions executed by the main CPU 11 described above, such as the reception of print data from the external data processor via the USB interface 19 or the network interface 20. Conversely, the condition for transitioning from the sleep mode to the first deep sleep mode is that a fixed time (five minutes, for example) has elapsed since shifting from the standby mode to the sleep mode.

The second deep sleep mode is a mode in which the printer 1 can be operated with lower power consumption than in the sleep mode described above, but with higher power consumption than in the first deep sleep mode. The power supply state in the second deep sleep mode is identical to that in the first deep sleep mode, with the low-voltage power supply 26 being driven in the low-voltage mode, as shown in FIG. 3.

As shown in FIG. 4, devices that are driven in the second deep sleep mode include only the main CPU 11, the sub CPU 12, the main interrupt controller 13, the sub interrupt controller 14, the SRAM 15, the USB interface 19, the network interface 20, the fax interface 21, the display panel 22, the input keys 23, the low-voltage power supply 26, and some sensor devices (not shown). This differs from the first deep sleep mode in that the main CPU 11 and the main interrupt controller 13 are driven.

Figure 7:
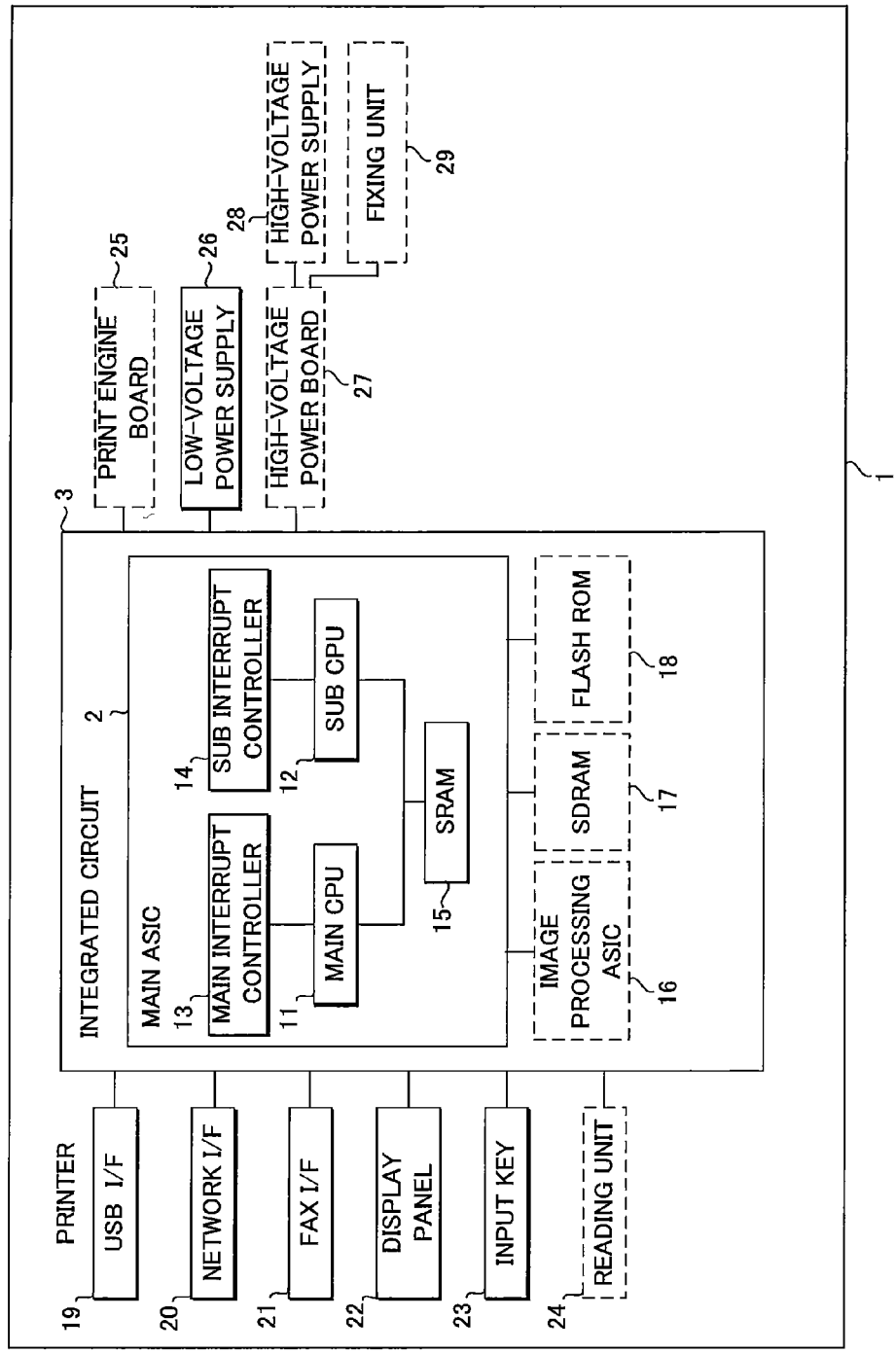
FIG. 7 is a block diagram showing the driven devices in a second deep sleep mode.

FIG. 7 shows this state in a block diagram. In the second deep sleep mode, as in the first deep sleep mode described above, essentially only those devices in the printer 1 related to the interfaces for the user are driven, while all other devices are halted. Accordingly, only the minimum essential devices are in the driven state, reducing power consumption of the printer 1 further than in the sleep mode.

As shown in FIG. 2, the condition for transitioning from the first deep sleep mode to the second deep sleep mode is reception of a command to execute a process that cannot be performed with the sub CPU 12. While this will be described later in greater detail, it is determined that processes cannot be performed by the sub CPU 12 when the process load on the sub CPU 12 becomes too high. Conversely, the condition for switching from the second deep sleep mode to the first deep sleep mode is the completion of the above processes.

Further, as shown in FIG. 2, the condition for transitioning from the second deep sleep mode to the sleep mode is the reception of the process data (a command for executing a process) for functions executed by the main CPU 11 described above, such as the reception of the print data from the external data processor via the USB interface 19 or the network interface 20.

Since the SDRAM 17 is halted in both the first and second deep sleep modes, programs for the sub CPU 12 can be loaded from the flash ROM 18 into the SRAM 15 in order to execute various processes in the SRAM 15. The SDRAM 17 also executes a self-refresh process in both modes in order to preserve data in the SDRAM 17 until the printer 1 is awakened.

Figure 8:
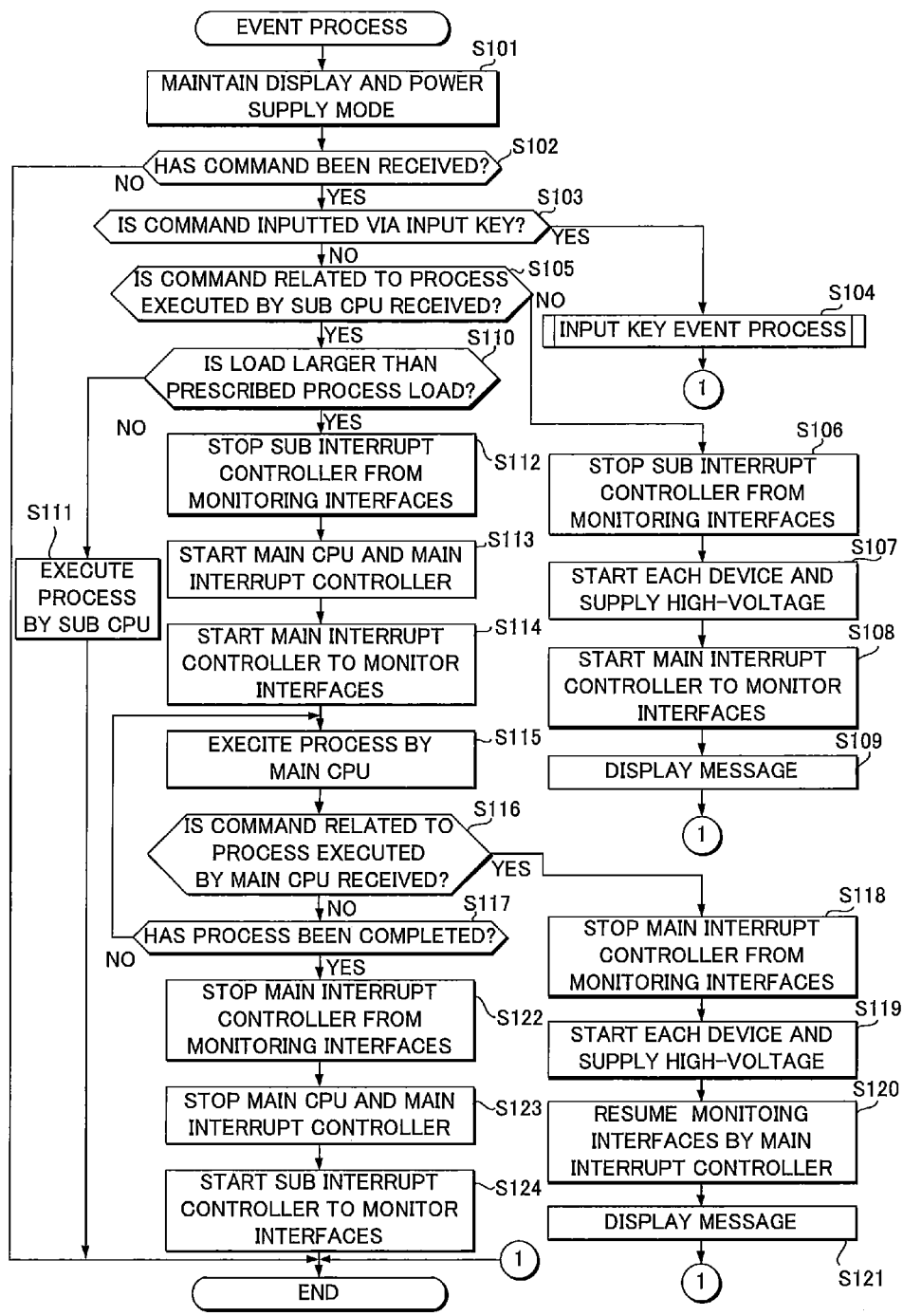
FIG. 8 is a flowchart illustrating steps in an event process performed during the first deep sleep mode and the second deep sleep mode.

The operations performed during the first and second deep sleep modes are particular features of the present invention as shown in FIGS. 8 and 9. Therefore, event processes performed during other operating modes for operations well known in the art will be omitted from the following description, while event processes for operations in the first and second deep sleep modes will be described in detail.

As described above, the printer 1 shifts from the sleep mode to the first deep sleep mode after the prescribed time has elapsed. When the operating mode changes from the sleep mode to the first deep sleep mode, the main CPU 11 performs a process to update the display of the display panel 22 prior to being halted.

More specifically, the main CPU 11 is halted after updating the display on the display panel 22 to a special deep sleep mode display (for example, a text display with the message "The computer is now in deep sleep mode"). The main CPU 11 updates the display on the display panel 22 at this time, because the sub CPU 12 is unable to update the display on the display panel 22 and the main CPU 11 can no longer update the display after being halted.

In addition, when the operating mode shifts to the first deep sleep mode, the power supply mode of the low-voltage power supply 26 is changed to the low-voltage mode for supplying a low voltage.

Thereafter in the first deep sleep mode and the second deep sleep mode, at least one of the sub CPU 12 and the main CPU 11 executes the following event processes at short intervals.

In S101 the sub CPU 12 maintains the display on the display panel 22 for the deep sleep mode described above and maintains the power supply mode of the low-voltage power supply 26 in the low-voltage mode. Hence, each time the event processes in the first and second deep sleep modes begin, the sub CPU 12 maintains the display on the display panel 22 and the power supply of the low-voltage power supply 26.

In S102 the sub CPU 12 determines whether a command has been received from the external data processor via the USB interface 19 or other interface, for example. If not (S102:

NO), then the sub CPU 12 ends the event processes for the first and second deep sleep modes. However, if so (S102: YES), then in S103 the sub CPU 12 determines whether the received command is a command based on a user operation via the input keys 23. Note that the sub interrupt controller 14 monitors the interfaces in S102.

If the received command is a command inputted via the input keys 23, such as a copy command for utilizing the copy function (S103: YES), then in S104 the sub CPU 12 executes an input key event process shown in FIG. 9, and subsequently the event processes for the first and second deep sleep modes are ended. The input key event process will be described later.

However, if a negative determination has been made in S103 (S103: NO), then in S105 the sub CPU 12 determines whether the received command is a command to implement a process executed by the sub CPU 12. If the received command indicates a process to be executed by the main CPU 11 rather than the sub CPU 12, such as a print command utilizing the print function (S105: NO), the sub CPU 12 shifts the operating mode of the printer 1 to the sleep mode in S106 through S109. At this time, in S106 the sub CPU 12 stops the sub interrupt controller 14 from monitoring the interfaces.

In S107 the sub CPU 12 restarts each of the halted devices (devices represented by dashed lines in FIG. 6) including the high-voltage power supply 28, so that the high-voltage power supply 28 begins supplying a high voltage. At this time, the power supply mode of the low-voltage power supply 26 is switched to the normal mode so that a high-voltage is supplied by both power sources.

In S108 the main interrupt controller 13 is activated to begin monitoring the interfaces. In S109 the main CPU 11 updates the display of the display panel 22 to a special display for the sleep mode (for example, a text display with the message "The computer is now in sleep mode"). When the process in S109 is completed, the operating mode of the printer 1 has completed its shift to the sleep mode.

Executing the processes in S106 through S109 described above ends the event processing in the first and second deep sleep modes and begins event processing in the conventional sleep mode. Since the main CPU 11 normally executes a process in response to the command received in S102 at this time, the operating mode of the printer 1 is shifted to the execution mode from the sleep mode via the standby mode.

There is a particular order in which the devices are started in S107. First, the main CPU 11 and the main interrupt controller 13 are started, after which devices in the integrated circuit 3, including the image-processing ASIC 16, the SDRAM 17, and the flash ROM 18, are started. Next, the high-voltage power board 27 is started, whereby power from the high-voltage power supply 28 is supplied to the print engine board 25, the reading unit 24, and other high-load devices to actuate these devices. As power is supplied from the high-voltage power supply 28, the power supply mode of the low-voltage power supply 26 is switched from the low-voltage mode to the normal mode.

Returning to S105 in the event processes of FIG. 8, if the sub CPU 12 determines that the received command specifies a process to be executed by the sub CPU 12 itself, such as a connection maintenance process for the USB interface 19 (S105: YES), then in S110 the sub CPU 12 determines whether the load required for the process specified by the received command is larger than a prescribed process load. Specifically, the sub CPU 12 predicts whether the load will be high in the subsequent process by detecting the volume of data in the received command and the number of commands that have been received consecutively, for example.

If not (particularly when the received command specifies a process to be executed on the sub CPU 12 that has a low-process load, such as the connection maintenance process for the USB interface 19; S110: NO), then in S111 the sub CPU 12 executes the process specified by the received command and subsequently ends the event processing in the first and second deep sleep modes.

However, if so (particularly when there are processes of a high load to be executed consecutively on the sub CPU 12, such as when the connection maintenance process for the USB interface 19 is performed a plurality of times consecutively, for example; S110: YES), then in S112 the sub CPU 12 stops the sub interrupt controller 14 from monitoring the interfaces and in S113 starts the main CPU 11 and the main interrupt controller 13. In S114 the main CPU 11 controls the main interrupt controller 13 to begin monitoring the interfaces, at which time the operating mode of the printer 1 has shifted completely to the second deep sleep mode. Here, the display on the display panel 22 is not updated.

In S115 the main CPU 11 executes the process specified by the received command in S102. In S116 the main CPU 11 determines whether a command related to a process executed by the main CPU 11 (such as a print command) is received via the USB interface 19 or other interface after a positive determination has been made in S105. If not (S116: NO), then in S117 the main CPU 11 determines whether the process in S115 has been completed. If the main CPU 11 determines that the process has not been completed (S117: NO), the main CPU 11 returns to S115 and continues the process. Hence, the determination in S116 is repeated continuously until the process in S115 is complete.

The main CPU 11 will reach a NO determination in S116 both for cases in which a command was not received after a positive determination has been made in S105 and for cases in which another command that specifies a process to be executed by the sub CPU 12 is received. In the latter case, the main CPU 11 reaches a NO determination in S117 and then in S115 executes the process specified by the another command, even after completing the process specified by the command received in S102.

However, if a positive determination has been made in S116 (S116: YES), then in S118 through S121 the main CPU 11 shifts the operating mode of the printer 1 to the sleep mode according to substantially the same operations described in S106 through S109. That is, in S118 the main CPU 11 stops the main interrupt controller 13 from monitoring the interfaces. In S119 the main CPU 11 starts each of the suspended devices indicated by dashed lines in FIG. 7, including the high-voltage power supply 28 for supplying a high voltage. At this time, the power supply mode of the low-voltage power supply 26 is also switched to the normal mode so that both power sources supply a high voltage.

In S120 the main CPU 11 controls the main interrupt controller 13 to resume monitoring the interfaces. In S121 the main CPU 11 updates the display on the display panel 22 to the special display for the sleep mode.

Unlike the process described in S106 through S109, the main CPU 11 is not restarted because the printer 1 was in the second deep sleep mode in which the main CPU 11 is already running.

By executing the processes in S118 through S121 as described above, the event processing for the first and second deep sleep modes is terminated, and the printer 1 begins the event processing for the conventional sleep mode. Normally, the main CPU 11 then shifts the printer 1 from the sleep mode to the execution mode via the standby mode in order to execute a process specified by the command received in S116.

On the other hand, if the main CPU 11 determines in S117 that the process has been completed (S117: YES), then in S122-S124 the main CPU 11 shifts the operating mode of the printer 1 back to the first deep sleep mode since there is no longer a need to remain in the second deep sleep mode. That is, in S122 the main CPU 11 stops the main interrupt controller 13 from monitoring the interfaces. In S123 the main CPU 11 and the main interrupt controller 13 are halted. In S124 the sub CPU 12 controls the sub interrupt controller 14 to begin monitoring the interfaces, and then the event processing for the first and second deep sleep modes ends.

Next, the input key event process in S104 of FIG. 8 will be described with reference to the flowchart in FIG. 9.

In S200, the sub CPU 12 activates the main CPU 10 and the main interrupt controller 13. In S201 the sub CPU 12 saves the command received in S102 of FIG. 8 in the SRAM 15. In S202 the sub CPU 12 determines whether start-up of the main CPU 11 and the main interrupt controller 13 has completed. If start-up of these components has not completed (S202: NO), in S203 the sub CPU 12 determines whether a new command has been received from the input keys 23. If so (S203: YES), then in S201 the sub CPU 12 saves the new command in the SRAM 15, whereas if not (S203: NO), the sub CPU 12 returns to S202.

Thus, the sub CPU 12 repeatedly determines whether a new command has been received via the input keys 23 and saves received new commands in the SRAM 15 until the start-up of the main CPU 11 and the main interrupt controller 13 has completed. This process is performed for cases in which the user executes consecutive operations on the input keys 23, such as when the user presses a start key for a copy command a plurality of times.

However, if the sub CPU 12 determines in S202 that start-up of the main CPU 11 and the main interrupt controller 13 is complete (S202: YES), in S204 the sub CPU 12 stops the sup interrupt controller 14 from monitoring the interfaces, and in S205 the main CPU 11 controls the main interrupt controller 13 to begin monitoring the interfaces.

Next, as described in S119 of FIG. 8, in S206 the main CPU 11 starts all of the suspended devices indicated by dashed lines in FIG. 7, including the high-voltage power supply 28, which begins supplying a high voltage. At this time, the power supply mode of the low-voltage power supply 26 is switched to the normal mode so that both power sources are supplying a high voltage. By executing the process in S204 through S206, as described above, the operating mode is shifted to the execution mode via the sleep mode and the standby mode. The main CPU 11 executes the process specified by the command stored in SRAM 15 in the execution mode.

In S207 the main CPU 11 controls the various devices to execute the process for the command saved in the SRAM 15. In S208 the main CPU 11 determines whether a new command has been received from the input keys 23. If so (S209: YES), then in S209 the main CPU 11 saves the new commands in the SRAM 15. The processes in S208 and S209 are identical to the processes in S203 and S201 described above.

After completing the process in S209 or when a new command is not received in S208 (S208: NO), then in S210 the main CPU 11 determines whether processes have been completed for all commands stored in the SRAM 15. If not (S210: NO), then the main CPU 11 returns to S207 and executes a process for another command saved in the SRAM 15. Hence, the main CPU 11 continually executes processes while receiving new commands until processes have been completed for all commands in the SRAM 15.

If so (S210: YES), then the input key event process ends and, additionally, the event processes for the first and second deep sleep modes end.

The printer 1 according to the embodiment is configured with a plurality of CPUs 11 and 12. When the operating mode is shifted to the second deep sleep mode, such that the main CPU 11 executes a process for the received command (S115), which is not normally executed by the main CPU 11, but requiring a heavy process load. As a result, the process is efficiently executed by the main CPU 11.

When the main interrupt controller 13 is in a driven state is monitoring the interfaces (S114), the main CPU 11 can directly process received commands (S115). Accordingly, the main CPU 11 can efficiently execute processes based on these commands for all devices, regardless the type of command.

When switching the controllers that monitor interfaces, the controllers temporarily stop monitoring the interfaces (S106, S112), which avoids a condition that both controllers simultaneously monitor the interfaces and detect commands from the interfaces. As a result, commands from each interface can be reliably detected.

If the user executes consecutive operations on the input keys 23, a plurality of commands may be issued via the input keys 23 within a relatively short period of time. Only when a command inputted via the input keys 23 is detected, the printer 1 stores the consecutive operations on the input key 23 in the SRAM 15 (S201, S209). Thus, the printer 1 can reliably execute processes based on the commands stored in the SRAM 15 (S207) after the controller monitoring the interfaces is switched.

Further, when the sub CPU 12 determines in S105 that a received command specifies a process to be executed by the sub CPU 12 (S105: YES), and when the load required for the process is greater than the prescribed process load (S110: YES), then the command is one that does not require the main CPU 11 to control devices for implementing a process and is processed internally. In other words, the main CPU 11 controls devices to internally execute the process normally executed by the sub CPU 12 when the process load is high. Accordingly, the user need not be made aware that the operating mode has changed.

Since the user need not be made aware of a shift from the first deep sleep mode to the second deep sleep mode, the display on the display panel 22 need not be changed (updated) when shifting from the first deep sleep mode to the second deep sleep mode. Conversely, the display on the display panel 22 need not be changed when shifting back from the second deep sleep mode to the first deep sleep mode.

However, when the received command is not a command specifying a process executed by the sub CPU 12 (S105: NO and S116: YES) and when the main CPU 11 is started up (S107 and S119), the main CPU 11 executes the process specified by the command by controlling the various devices. In this case, the user must be made aware that the operating mode has changed. In other words, the user must be made aware of the execution status of processes that the main CPU 11 executes through device control and must be made aware of the operating mode of the printer 1 at this time. Accordingly, the display on the display panel 22 is changed (updated) to notify the user of the current operating mode.

While starting up devices, the printer 1 declines to receive commands from the user or external devices by temporarily stopping the controllers from monitoring the interfaces (S106, S112, and S118), thereby preventing the reception of commands during device start-up. Similarly, while halting devices, the printer 1 declines to accept commands from the user or external devices by temporarily stopping the controllers from monitoring the interfaces (S122), thereby preventing the reception of commands while devices are being halted.

When using both the low-voltage power supply 26 and the high-voltage power supply 28 to supply power respectively, the voltage supplied by the low-voltage power supply 26 is sometimes increased by the effect of a high voltage supplied by the high-voltage power supply 28, thereby affecting the gain (efficiency) of the low-voltage power supply 26.

Since it is not a problem for the low-voltage power supply 26 to be affected by the power from the high-voltage power supply 28 when supplying power at a high voltage to the entire printer 1, a high voltage can be integrally supplied by the high-voltage power supply 28 and the low-voltage power supply 26 to each device in the printer 1. The low-voltage power supply 26 is not affected by power from the high-voltage power supply 28 when supplying power at a low voltage because the high-voltage power supply 28 does not supply power at this time. Hence, power can be supplied in a low-voltage mode in which the low-voltage power supply 26 alone supplies a stable low voltage to each device.

While the invention has been described in detail with reference to the specific embodiment thereof, it would be apparent to those skilled in the art that many modifications and variations may be made therein without departing from the spirit of the invention, the scope of which is defined by the attached claims.

(1) In the embodiment, the printer 1 serving as the image processing device is a multifunction device, but the present invention may be applied to any image processing device capable of implementing functions related to image data, such as a printer having no scanner function or facsimile function, a standalone facsimile device, or a standalone image-reading device.

(2) The functions possessed by the image processing device of the present invention are described as a print function, a copy function, a scan function, and a facsimile communication function, but the image processing device of the present invention may have any function related to image data, such as an image accumulation function for accumulating image data in a hard disk drive (not shown), a special image extraction function for extracting special images from scan data or the like, an e-mail function, and a PC-fax function for receiving image data from a terminal device and transmitting facsimile data to an external facsimile device based on the received image data. Further, an operation on the input keys 23 may also be treated as a function (an operation function) and the printer 1 may execute a process on image data indirectly when implementing the operation function.

(3) While the printer 1 according to the embodiment is provided with two CPUs 11 and 12, the image processing device of the present invention may be provided with three or more CPUs. Further, while the printer 1 of the embodiment incorporates two deep sleep modes, the image processing device of the present invention may incorporate three or more deep sleep modes.

(4) In the embodiment, the two CPUs 11 and 12 are defined as differing in processing capacity and power consumption, but the processing capacity and power consumption of the CPUs may be identical, provided that the length of their start-up time differs. Alternatively, one of two CPUs having shorter start-up time may have a higher processing capacity with lower power consumption.

(5) In the embodiment, the main CPU 11, the main interrupt controller 13, the sub CPU 12, and the sub interrupt controller 14 are all running during the execution mode, the standby mode, and the sleep mode. However, the sub CPU 12 and the sub interrupt controller 14 may be suspended during these operating modes. In other words, the sub CPU 12 and the sub interrupt controller 14 may be configured to operate only in the first and second deep sleep modes.

(6) The order in which devices are started up in S107 of FIG. 8 is described in the embodiment. Here, the order in which devices are halted when shifting from the sleep mode to the first deep sleep mode will be described.

First, the CPU stops the main interrupt controller 13 from monitoring the interfaces and subsequently halts the supply of power from the high-voltage power supply 28 to high-load devices, such as the print engine board 25 and the reading unit 24. Next, the sub CPU 12 halts the high-voltage power board 27, after which the main CPU 11 and the main interrupt controller 13 are halted. Next, the sub CPU 12 reads a program for the sub CPU 12 from the flash ROM 18 and saves the program in the SRAM 15. Next, the sub CPU 12 halts all devices in the main ASIC 2, including the image-processing the ASIC 16, the SDRAM 17, and the flash ROM 18, but excluding the sub CPU 12, the sub interrupt controller 14, and the SRAM 15. The sub interrupt controller 14 is then activated to begin monitoring the interfaces, at which time the shift to the first deep sleep mode is complete.

By temporarily stopping the controllers from monitoring the interfaces while the devices are being halted in this way, it is possible to prevent commands from being received during the process.

(7) The embodiment described above does not consider commands received via the input keys 23 in the process of S116 in FIG. 8. However, a process similar to the input key event process of S104 may be executed at this time when a command is received via the input keys 23. Specifically, when the main CPU 11 determines in S116 that a command has been received via the input keys 23, the main CPU 11 may jump to S206 of FIG. 9 and execute the process in S206 through S210. In other words, the process in S201 through S205 may be omitted because the main CPU 11 and the main interrupt controller 13 are already running by the time the process in S116 is executed.

(8) While the method of handling operations on the input keys 23 is not mentioned in the embodiment, pressing and releasing of one of the input keys 23 may be inputted as separate operations (an ON operation and an OFF operation). Hence, the input key event process described in the embodiment is useful in this case since the user can input a plurality of commands in a short time-span by consecutively pressing and releasing the input keys 23.

(9) In the example of the embodiment, the low-voltage power supply 26 is provided with two power supply modes, but the low-voltage power supply may be provided with three or more power supply modes.

What is claimed is:

1. An image processing device comprising:
    a detecting unit configured to detect a command;
    an image-processing circuit;
    a heater;
    a plurality of processors including a first processor and a second processor having a lower processing capacity than the first processor, the first processor having a halted state and an active state, the first processor not being driven in the halted state and being driven in the active state; and
    memory storing instructions that, when executed, cause the image processing device to:
    determine whether or not the command indicates that a process is to be executed by the first processor;
    determine whether or not a processor load, of the second processor, required for the process is larger than a prescribed threshold processor load;
    if the command does not indicate that the process is to be executed by the first processor:
        if the processor load of the second processor required for the process is larger than the prescribed threshold processor load, activate a first power state, in which the first processor is activated to the active state, and execute the process using the first processor without using the second processor while the second processor is active;
        if the processor load of the second processor required for the process is not larger than the prescribed threshold processor load, execute the process using the second processor in a second power state, wherein the image-processing circuit and the heater are both powered off in the second power state;
    if the command indicates that the process is to be executed by the first processor:
        activate a third power state, in which the image-processing circuit and the second processor are driven and the heater is powered off;
        upon receipt of an instruction to initiate image formation, activate a fourth power state in which the heater and the image-processing circuit are both driven; and
        if the image processing device has not received an instructions to initiate image formation for a predefined amount of time since switching to the third power state, switch from the third power state to the second power state.

2. The image processing device according to claim 1, wherein the first processor, when in the active state, is configured to monitor the detecting unit.

3. The image processing device according to claim 2, wherein the second processor, when monitoring of the detecting unit is switched from the second processor to the first processor by an activation of the first processor, stops monitoring the detecting unit before the first processor begins monitoring the detecting unit upon being activated.

4. The image processing device according to claim 3, wherein the first processor has a higher processing capacity than the second processor.

5. The image processing device according to claim 3, further comprising:
    an operation unit configured to issue another command when operated by a user,
    wherein the memory stores the other command,
    wherein, when the operation unit issues the other command while the first processor is in the halted state, the second processor is configured to monitor the detecting unit, and the memory stores the other command, and
    wherein, when the first processor is activated, the first processor executes the process for the other command stored in the memory.

6. The image processing device according to claim 1, further comprising a display for displaying an image, the display being configured to change the image under the control of the first processor,
    wherein, if the first processor is activated after determining that the command does not indicate that the process is to be executed by the first processor and that the processor load required for the process is larger than the prescribed threshold processor load, the first processor controls the display to maintain the image, whereas if the first processor is activated after determining that the command indicates that the process is to be executed by the first processor, the first processor controls the display to change the image.

7. The image processing device according to claim 1, wherein the second processor stops monitoring the detecting unit when the first processor is about to be activated from a halted state, and the first processor begins monitoring the detecting unit after the first processor is activated.

8. The image processing device according to claim 1, further comprising:
a high voltage power supply configured to supply a high voltage;
a low voltage power supply having a first mode in which the low voltage power supply supplies a first low voltage and a second mode in which the low voltage power supply supplies a second low voltage lower than the first low voltage;
a first device operated at a voltage that exceeds a prescribed voltage; and
a second device operated at a voltage that does not exceed the prescribed voltage,
wherein, when the first device is operated, the high voltage power supply and the low voltage power supply in the first mode supply a voltage to the first device, whereas, when only the second device is operated, only the low voltage power supply in the second mode supplies the second low voltage to the second device.

9. A non-transitory computer readable medium storing instructions that, when executed, cause an image processing device to:
detect a command;
determine, while a first controller of the image processing device is in a halted state, of whether or not the detected command indicates that a process is to be executed by the first controller, wherein when the first controller is in the halted state, the first controller is not driven;
if the detected command does not indicate that the process is to be executed by the first controller:
determine, while the first controller is in the halted state, whether or not a load, of a second controller of the image processing device, required for the process is larger than a prescribed threshold value wherein the second controller has a lower processing capacity than the first controller; and
activate a first power state, in which the first controller is driven, if the load required for the process is larger than the prescribed threshold value so that the process is executed by the first controller without use of the second controller while the second controller is active;
maintain the first controller in the halted state in a second power state and control the second controller to execute the process if the load required for the process is larger than the prescribed threshold value, wherein an image-processing circuit and a heater are both powered off in the second power state;

if the detected command does indicate that the process is to be executed by the first controller:
activate a third power state in which the image processing circuit and the second controller are driven and the heater is powered off;
upon receipt of an instruction to initiate image formation, activate a fourth power state in which the heater and the image processing circuit are both driven; and
when the image processing device has not received any instructions to initiate image formation for a predefined amount of time since switching to the third power state, switch from the third power state to the second power state.

10. An image processing device comprising:
a detecting unit configured to detect a command;
a plurality of controllers including a first controller and a second controller having a lower processing capacity than the first controller;
an image processing circuit;
a heater;
a command determination unit configured to determine whether or not the command indicates that a process is to be executed by the first controller; and
a load determination unit configured to determine whether or not a load, of the second controller, required for the process is larger than a prescribed threshold value;
wherein the image processing device is configured to:
while the first controller is in a halted state, if the command determination unit makes a negative determination and if the load determination unit makes a positive determination, activate a first power state in which the first controller is activated and execute the process using the first controller in the first power state without using the second controller while the second controller is active;
if the command determination unit makes a negative determination and if the load determining unit makes a negative determination, execute the process using the second controller in a second power state, in which the image processing circuit and the heater are both powered off;
if the command determination unit makes a positive determination, activate a third power state in which the image-processing circuit and the second controller are driven and the heater is powered off;
upon receipt of an instruction to initiate image formation, the image processing device is caused to activate a fourth power state in which the heater and the image processing circuit are both driven; and
when the image processing device has not received an instructions to initiate image formation for a predefined amount of time since switching to the third power state, switch from the third power state to the second power state.

* * * * *